United States Patent [19]

Imazeki et al.

[11] 4,330,816

[45] May 18, 1982

[54] OVERCURRENT PROTECTION APPARATUS

[75] Inventors: Ryoji Imazeki; Masayuki Hattori, both of Hachioji; Shigeo Nakamura, Hino, all of Japan

[73] Assignee: Fujitsu Fanuc Limited, Tokyo, Japan

[21] Appl. No.: 109,190

[22] Filed: Jan. 2, 1980

[51] Int. Cl.$^3$ .......................................... H02H 7/122
[52] U.S. Cl. ...................................... 363/56; 363/21; 363/26
[58] Field of Search ...................... 363/20, 21, 24–26, 363/50, 55, 56, 97, 131, 133–134; 361/18, 87

[56] References Cited

U.S. PATENT DOCUMENTS

| | | | |
|---|---|---|---|
| 3,614,587 | 10/1971 | Schwarz | 363/56 X |
| 3,916,282 | 10/1975 | Rothermel | 363/25 |
| 3,930,194 | 12/1975 | Walker | 363/56 |
| 4,087,850 | 5/1978 | Koizumi | 363/21 |

*Primary Examiner*—William M. Shoop
*Assistant Examiner*—Peter S. Wong
*Attorney, Agent, or Firm*—Staas & Halsey

[57] ABSTRACT

Disclosed is an overcurrent protection apparatus in a switching power supply, including a power switching element for interrupting the primary current of a transformer, and a control circuit for generating control pulses which are modulated in pulse width in accordance with a variation in the rectified output voltage on the secondary side of the transformer, the opening and closing of the power switching element being controlled by the control pulses to maintain the rectified output voltage at a constant value. The overcurrent protection apparatus further includes overcurrent detection means which issues an overcurrent detection signal after detecting that a current flowing into the power switching element has exceeded a prescribed value; memory means set by the overcurrent signal; a gate circuit for blocking the passage of control pulses when the memory means has been set; and reset means for resetting the memory means in response to the trailing edge of a control pulse. The switching of the power switching element is controlled by the memory means so that the power switching element is turned off when the memory means has been set, and turned on when the memory means has been reset.

11 Claims, 5 Drawing Figures

OVERCURRENT PROTECTION APPARATUS

BACKGROUND OF THE INVENTION

1. Field of the Invention

This invention relates to an overcurrent protection apparatus in a switching power supply, and more particularly to an overcurrent protection apparatus for protecting a power switching element from damage, which element is employed in a switching power supply.

2. Description of the Prior Art

A stabilized power supply of a continuously controlled type ordinarily invites losses in a control circuit and therefore is unsuitable for a stabilized power supply of the type that supplies high power. On the other hand, a switching power supply is not accompanied by large control circuit losses and for this reason is well-suited for application as a stabilized power supply of the type described.

A switching power supply generally includes a rectifier circuit for rectifying AC voltage, a transformer having a primary winding connected to the rectifier circuit and a secondary winding connected to a smoothing circuit, and a power switching element for opening and closing the primary side of the transformer, with DC voltage of a prescribed level being obtained from the output of the smoothing circuit by suitable switching control of the power switching element.

A power switching element in the switching power supplies of the aforesaid type is likely to be damaged if an excessive current flows into it. This damage to the power switching element owing to the inflow of excessive current occurs when the iron core of the transformer saturates, when a short-circuit occurs in the secondary wiring for some unforeseen reason, or when the associated circuitry is overloaded. It is therefore common practice in the conventional switching power supplies to provide the primary circuit with current detection means operable to detect the value of the primary current, in which the arrangement is such that an excessive primary current is not permitted to flow into the power switching element because the element is turned off when the primary current is detected as exceeding a predetermined value. However, an important drawback in this conventional overcurrent protection apparatus is a delay between detection of primary current and the opening of the power switching element. The delay is not a major factor as long as the increase in primary current defines a comparatively gentle curve, in which case the power switching element can be almost fully protected. The problem arises when the primary current increases abruptly due to an accident such as saturation of the transformer core or a short-circuit on the secondary side, in which case the delay mentioned above does not allow the power switching element to be protected until after the excessive current has begun to flow. The power switching element suffers damage as a result. A method of preventing such damage in the conventional overcurrent protection apparatus involves the use of a power switching element of a large current capacity, but the cost of these switching elements increases in proportion to their current capacity, and the amount of heat which is generated does not dissipate easily.

Another problem encountered in the conventional overcurrent protection apparatus involves the supply of the DC voltage. Once an overcurrent has been detected the power switching element is turned off to protect it and then, when the cause of the overcurrent has been eliminated, the switching of the element resumes in normal fashion so that the supply of the DC voltage can continue. However, the supply of the DC voltage also is terminated even if the primary current accidentally becomes excessive only for a brief instant and then returns to a normal value. This unnecessary interruption in DC voltage diminishes operating efficiency since it may deprive the DC-powered equipment such as a numerical control equipment of its driving voltage and hence cause the equipment to cease operating. Moreover, although an excessive inrush current generally flows into the primary circuitry when an AC power source is connected, it is necessary that the conventional overcurrent protection apparatus be designed so that it will not react to this inrush current. Such a requirement complicates the circuitry and raises the cost.

A further difficulty in the prior-art apparatus involves the fact that there are occasions where the switching elements in a switching power supply are turned on for a longer period of time than they are turned off, which means that the energy stored in the inductance of the transformer when the switching elements are on is not completely released. The remaining energy gradually accumulates, causes the transformer to saturate, and leads to an excessive primary current. This in turn invites damage to the elements and an interruption in DC voltage.

SUMMARY OF THE INVENTION

The present invention discloses an overcurrent protection apparatus for use in a switching power supply, and more particularly an overcurrent protection apparatus which, in spite of a malfunction such as a short-circuit, prevents the damage of a power element employed in a switching power supply while enabling a continuous supply of DC voltage.

It is therefore an object of the present invention to prevent the destruction of a power switching element owing to flow of an excessive current therethrough, this being accomplished by turning the power element off promptly, that is, without delay, as soon as the overcurrent condition is detected.

It is another object of the present invention to provide an overcurrent protection apparatus capable of supplying DC voltage even after the power switching element has been turned off by the detection of an overcurrent condition, this being accomplished by allowing the power switching element to be turned on and off continuously during the cycle that immediately follows the initial disabling of the element.

It is still another object of the present invention to provide an overcurrent protection apparatus in a switching power supply, which is capable of continuing the supply of DC voltage in a normal manner despite the flow of instantaneous overcurrents.

It is yet another object of the present invention to provide an overcurrent protection apparatus which is capable of preventing the flow of overcurrent owing to transformer saturation, this being accomplished by turning a power switching element off longer than it is turned on.

It is a further object of the present invention to provide a novel overcurrent protection apparatus of a simple construction.

The features and advantages of the invention will be apparent from the following description taken in connection with the accompanying drawings.

DETAILED DESCRIPTION OF THE PREFERRED EMBODIMENTS

Figure 1:
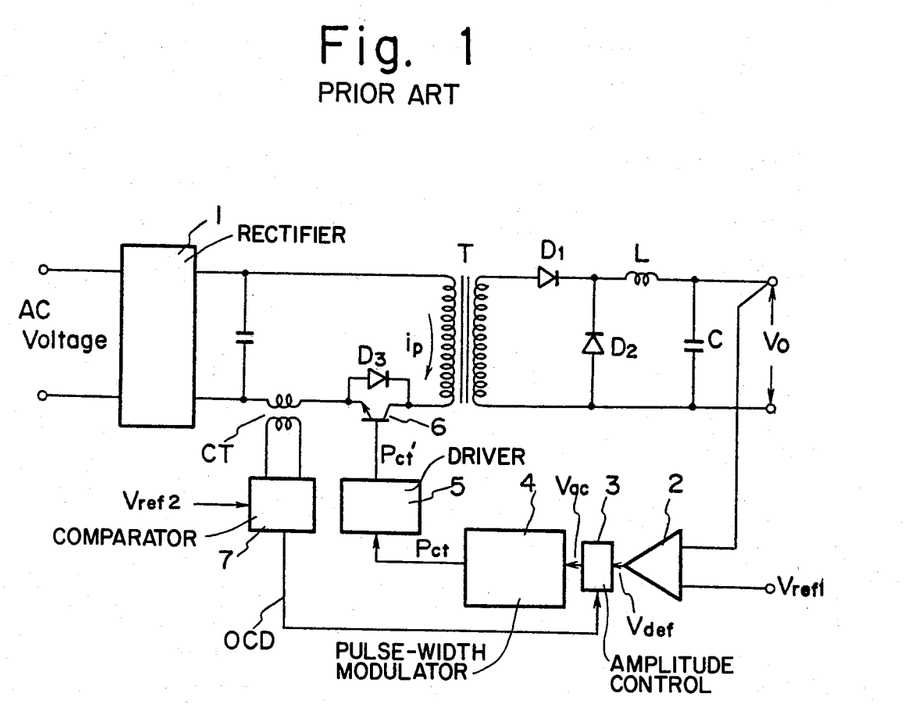
FIG. 1 is a block wiring diagram of a conventional overcurrent protection apparatus employed in a switching power supply.

Illustrated in FIG. 1 is a block diagram that depicts one example of a conventional switching power supply, the system including a rectifier circuit 1, a transformer T, diodes $D_1$, $D_2$, a choke L and capacitor C for smoothing, a diode $D_3$ for releasing the energy stored in transformer T, a differential amplifier 2 for comparing an output voltage $V_o$ with a reference voltage $V_{ref1}$ and for producing a voltage $V_{def}$ indicative of the difference therebetween, an amplitude control circuit 3 for controlling the amplitude of the voltage $V_{def}$ provided by differential amplifier 2, a pulse width modulator 4 for generating a control pulse $P_{ct}$ whose width is modulated in accordance with a signal $V_{ac}$ provided by amplitude control circuit 3, a driver 5 for amplifying the weak control pulse $P_{ct}$ to turn on a power switching element, to be described hereinafter, when the control pulse $P_{ct}$ is present, and a switching element 6 which is switched in accordance with a driving pulse $P_{ct'}$ from driver 5 to deliver the DC power from rectifier 1 to rectifying and smoothing sections connected to the secondary side of transformer T. Pulse width modulator 4 is composed of circuitry which is not shown, such as a saw tooth generator for generating a saw tooth signal $V_{saw}$ of a fixed amplitude and frequency, and a comparator for comparing the amplitude of an output signal $V_{ac}$ from amplitude control circuit 3 with the amplitude of the saw tooth signal $V_{saw}$, the output of the comparator going to a logic "1" level to produce the control pulse $P_{ct}$ when $V_{saw}$ (amplitude) $\geq V_{ac}$ (amplitude).

There are three occasions on which an excessive current can flow into switching element 6 during the operation of the conventional switching power supplies of the type described. They are:

(1) when the core of transformer T saturates;

(2) when the diodes $D_1$, $D_2$ on the secondary side of the transformer are short-circuited; and (3) when the circuitry is overloaded. This necessitates the provision of an overcurrent protection circuit.

One method of protecting a switching power supply involves limiting the value of primary current $i_p$ to a fixed upper limit by regulating the pulse width of control pulse $P_{ct}$. The arrangement of FIG. 1 accomplishes this through a current regulating-type protection circuit the construction and operation of which will now be described.

Specifically, in FIG. 1, a current transformer CT is provided to detect the primary current $i_p$, and a comparator circuit 7 is connected to the current transformer CT, to amplitude control circuit 3, and to a reference voltage $V_{ref2}$, the comparator 7 being adapted to compare a signal from current transformer CT with the reference voltage $V_{ref2}$ that defines the limiting level of primary current $i_p$, and to deliver to amplitude control circuit 3 an overcurrent signal OCD which is produced when the primary current $i_p$ exceeds the limiting level. Amplitude control circuit 3 responds to overcurrent signal OCD by suppressing the amplitude of the output voltage $V_{def}$ from differential amplifier 2 to a low level. Pulse width modulator 4 responds in turn by regulating the width of its output control pulse $P_{ct}$, whereby the value of primary current $i_p$ is prevented from exceeding a fixed upper limit.

In the above arrangement a signal applied to the input side of differential amplifier 2 must pass through or be acted upon by the differential amplifier, a phase compensating circuit which is usually inserted into the circuitry, the amplitude control circuit 3, the pulse width modulator 4, etc., before a signal can be obtained at the output side of the driver 5. The result is a delay in the initiation of the protecting operation. While this delay may not hamper almost full protection of the power switching element when an overload causes only a comparatively gentle increase in the primary current $i_p$, there are frequently cases where the delay does not allow the primary current to be limited early enough, as when the core of transformer T saturates or when a short-circuit develops on the secondary side of the transformer T to cause a sharp rather than a gentle increase in the primary current. In other words, when a control pulse $P_{ct}$ is generated the pulse width thereof is in general not subjected to suitable control because of the delay, but the pulse width of a subsequently generated control pulse will be regulated since the delay will have already elapsed, and this control pulse will function to limit the primary current $i_p$ to a value below the upper limit. This means that the overcurrent protecting operation is delayed by one control pulse. However, since power switching element 6 remains on because of the improperly regulated initial control pulse, and remains on until the initial control pulse vanishes, the switching element will be damaged if it is subjected to an excessive primary current $i_p$ having a steep rising edge while the element is conducting. Power switching elements of a large capacity therefore are adopted in the prior art in order to prevent such damage.

Conventional overcurrent protection circuits also are designed such that the power switching element is turned off once an overcurrent has been detected and then, when the cause of the overcurrent has been eliminated, the gating control of the element is resumed to supply the DC voltage. However, the supply of the DC voltage also is terminated even if the primary current becomes excessive only for an instant before returning to a normal value. Termination of the DC voltage supply in such a case is not desirable.

Figure 2:
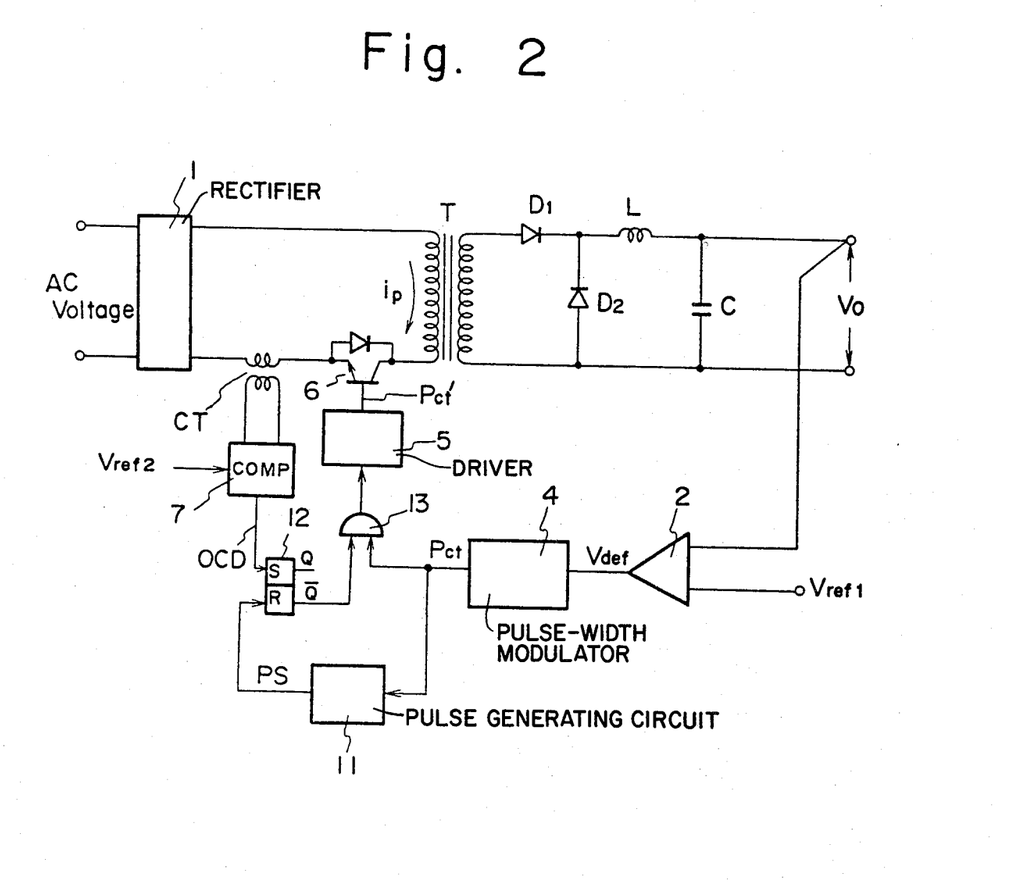
FIG. 2 is a block wiring diagram of an overcurrent protection apparatus according to the present invention.

An embodiment of the present invention is shown in the circuit block diagram of FIG. 2. The illustrated arrangement includes the addition of a pulse generating circuit 11 which generates a pulse PS that resets a latch circuit, to be described hereinafter, in response to the trailing edge of the control pulse $P_{ct}$ produced by pulse width modulator 4, and which comprises a differentiating circuit; a latch circuit 12 comprising an RS-type flip-flop, the latch being set by output signal OCD from comparator circuit 7, and reset by output pulse PS from pulse generating circuit 11; and an AND gate 13 one input terminal of which receives the control pulse $P_{ct}$ from pulse width modulator 4, the other input terminal of which receives reset signal $\bar{Q}$ from latch circuit 12. Here, the pulse generating circuit 11, flip-flop 12, AND gate 13 and comparator 7 form an overcurrent protection circuit. Other portions in FIG. 2 that bear the same reference numerals as those in FIG. 1 are similar thereto and need not be described again here.

Figure 3:
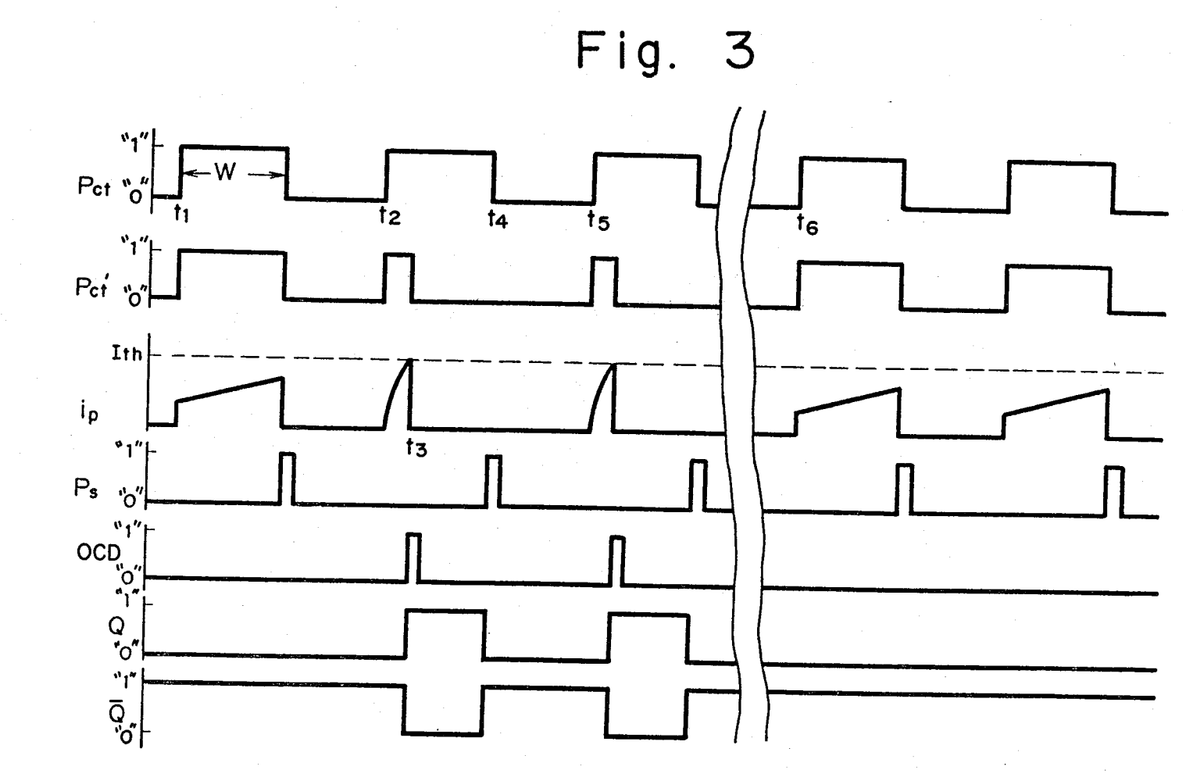
FIG. 3 is a waveform diagram associated with the block diagram of FIG. 2.

The operation of the present embodiment will now be described in connection with the waveforms of FIG. 3.

Differential amplifier 2 produces an output signal $V_{def}$ whose amplitude is based upon the difference in amplitude between the power supply output voltage $V_o$ and the reference voltage $V_{ref1}$. Pulse width modulator 4 responds to output signal $V_{def}$ by producing, at time $t_1$ in FIG. 3, a control pulse $P_{ct}$ having a prescribed pulse width W. Under normal operating conditions, that is, under a condition where the circuitry continues to operate with the primary current $i_p$ being within the prescribed limit, latch circuit 12 is in the reset state and its reset output $\bar{Q}$ is at logic "1". As a result, AND gate 13 is opened so that a driving pulse $P_{ct}'$, having the same pulse width as control pulse $P_{ct}$ appears at the output side of driver 5. The driving pulse turns switching element 6 on so that a primary current $i_p$, shown in FIG. 3, is allowed to flow through the primary side of transformer T. When control pulse $P_{ct}$ from pulse width amplifier 4 decays, pulse generating circuit 11 generates a pulse PS in conformance with the timing of this negative-going transition, and the pulse is applied to the reset terminal of latch circuit 12 which is in the reset state as mentioned above. The output $\bar{Q}$ of the latch therefore remains at logic "1".

Pulse width modulator 4 issues a second control pulse $P_{ct}$ at time $t_2$. If it is assumed that the secondary side of transformer T develops a short-circuit at this time for some unforeseen reason such as a metal filing falling across the secondary coil, the primary current $i_p$ will rise in an abrupt manner. This change is detected by current transformer CT. At time $t_3$, comparator circuit 7, comparing the output voltage from current transformer CT against reference voltage $V_{ref2}$ which decides the prescribed upper limit $I_{th}$ of the primary current, issues the overcurrent signal OCD since the current transformer output at this time is of a value that causes the limit $I_{th}$ to be exceeded. Overcurrent signal OCD is applied to latch circuit 12 without delay and sets the latch so that its outputs Q, $\bar{Q}$ go to logic levels "1" and "0", respectively. AND gate 13 is closed at the instant latch circuit 12 is set and therefore interrupts the control pulse $P_{ct}$ from pulse width modulator 4 so that only a fraction of the pulse passes through the gate. Thus, when control pulse $P_{ct}$ is interrupted at time $t_3$, driving pulse $P_{ct}'$ from driver 5 goes to logic "0" so that power switching element 6 is turned off. When the power switching element is turned off it is obviously protected because the primary current $i_p$ which had started to rise so sharply is immediately reduced to zero. When the control pulse $P_{ct}$ from pulse width modulator 4 decays at time $t_4$, pulse generating circuit 11 again generates pulse PS in conformance with the timing of this negative-going transition, and the pulse PS is again applied to the reset terminal of latch circuit 12 which is in the set state because of the previous operation. However, the arrival of pulse PS reverses the state of the latch so that its outputs Q, $\bar{Q}$ now go to logic levels "0" and "1", respectively. When the latch is reset in this manner, AND gate 13 is reopened.

If the secondary side of transformer T remains shorted by the metal filing as described above and pulse width modulator 5 delivers a third control pulse $P_{ct}$ at time $T_5$, the power switching element 6 remains protected by a repeat of the protecting operation just explained.

Let it now be assumed that the metal filing which has been the source of the short-circuit, and hence the reason for the foregoing repetitive protecting operation, is removed from across the secondary winding. If pulse width modulator 4 now generates a control pulse $P_{ct}$ at time $t_6$, the pulse will be passed by the open AND gate 13 and delivered to driver 5 which will respond by producing driving pulse $P_{ct}'$ that is applied to power switching element 6 to turn the switching element on. A normal primary current $i_p$ thereflows into the primary side of transformer T. Next, when the control pulse $P_{ct}$ from pulse width modulator 4 decays, pulse generating circuit 11 generates pulse PS in synchronism therewith, and the pulse is applied to the reset terminal of latch circuit 12. This represents normal operation which continues as long as the primary current does not exceed the limit $I_{th}$.

The protection of the power switching element in the foregoing embodiment proceeds in a similar manner to deal with increases in primary current resulting from overloading or from saturation of the transformer core. It should also be noted that the overcurrent signal OCD from comparator circuit 7 is temporarily retained in latch circuit 12 to preclude an oscillatory phenomenon which would occur if the signal OCD were sent directly from comparator circuit 7 to the input of AND gate 13. In other words, "latching" the signal OCD prevents the creation of a closed cycle in which the primary current $i_p$ increases, comparator 7 detects the overcurrent, AND gate 13 closes, the primary current $i_p$ decreases, comparator 7 detects the decrease in current, AND gate 13 opens, the primary current $i_p$ increases . . . and so on.

Figure 4:
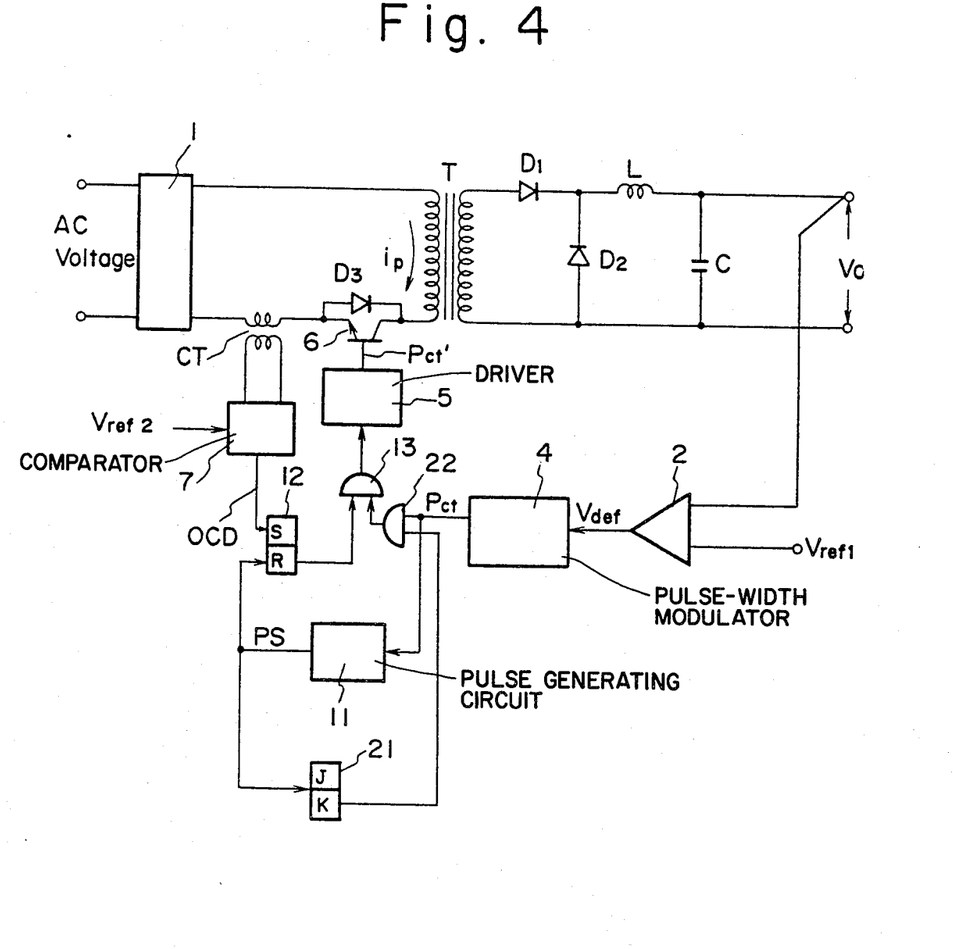
FIG. 4 is a diagram useful in describing another embodiment of the present invention.

Another embodiment of the present invention is depicted in FIG. 4 wherein the embodiment of FIG. 2 is provided additionally with means which allows the switching element to turn on for a period of time which is shorter than the period of time the element is turned off. The additional means are a JK-type flip-flop 21 which is set and reset in repetitive fashion each time a pulse PS arrives from pulse generating circuit 11, and an AND gate 22 which passes a control pulse $P_{ct}$ when the JK-type flip-flop 21 is in the reset state. If it is assumed that a JK-type flip-flop 21 initially is in the reset state, a first control pulse $P_{ct}$ will pass through AND gate 22, but a second such control pulse will be blocked by the AND gate 22 since JK-type flip-flop 21 will have been set by the initial control pulse via circuit 11. Thereafter, and in a similar manner, only odd-numbered control pulses $P_{ct}$ are allowed through AND gate 22; even-numbered control pulses are blocked. Thus, since only every other control pulse is applied to driver 5, power switching element 6 will, on the whole, be turned off longer than it is turned on even if the duty cycle of the control pulse $P_{ct}$ is greater than 50%. This will allow the energy stored in transformer T to be released through diode $D_3$ in a reliable manner and therefore prevents saturation of transformer T.

Figure 5:
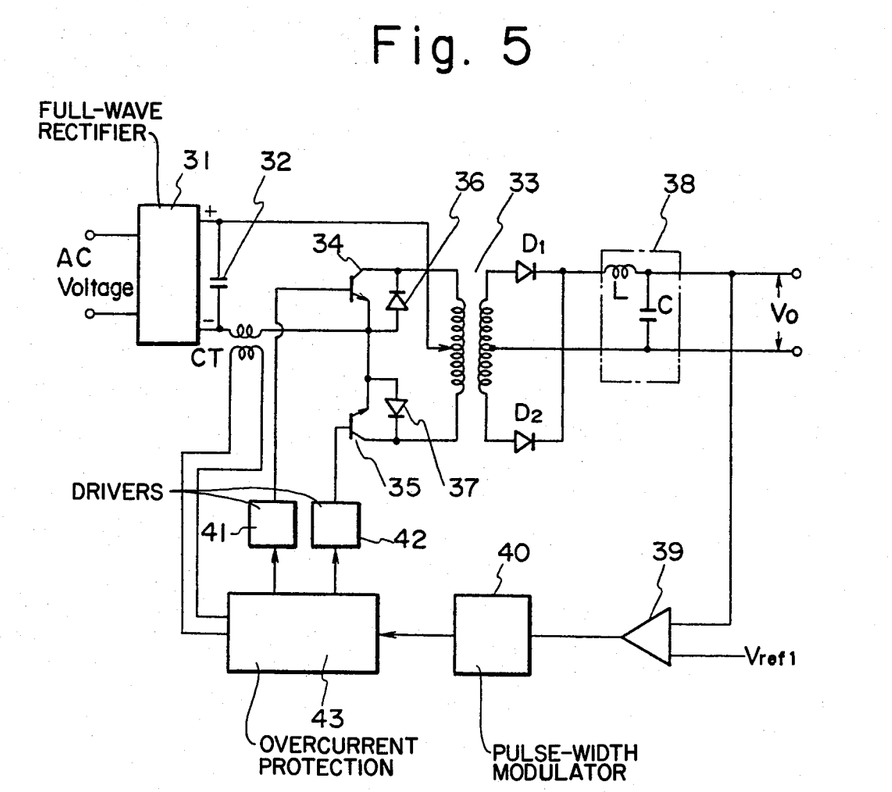
FIG. 5 is a block wiring diagram of another switching power source to which the present invention can be applied.

FIG. 5 shows another example of a switching power supply in which the present invention can be applied.

The arrangement of FIG. 5 includes a full-wave rectifier 31, a smoothing capacitor 32, a transformer 33 whose primary winding has its center tap connected to the plus side of the full-wave rectifier, power switching elements 34, 35 connected to respective ends of the primary winding, diodes 36, 37 through which the energy stored in transformer 33 is released when the corresponding power switching elements are off, rectifying diodes $D_1$, $D_2$, a capacitor C and choke L which construct a smoothing circuit, a current transformer CT for detecting primary current $i_p$, a differential amplifier 39, a pulse width modulator 40, drivers 41, 42 for driving the power switching elements, and an overcurrent protection circuit 43 which is similar to the arrangement of FIG. 2 except for the fact that the present circuit controls the switching of the two switching elements 34, 35 in an alternating manner. Since the power switching elements 34, 35 in this switching power supply are opened and closed alternatingly, each switching element is off longer than it is on so that transformer saturation which accompanies an accumulation of energy is prevented.

In summary, the present invention as described above protects a power switching element through an arrangement in which a gate circuit is inserted between the output side of a pulse width modulator and the input side of a driving unit that supplies the power switching element with driving pulses, the gate circuit being closed by an overcurrent signal produced as a result of a detection operation by overcurrent detection means. The closure of the gate circuit immediately blocks the driving pulses applied to the switching element so that the protecting operation is not delayed by such circuitry as a phase compensating circuit and amplitude control inserted in the path between the input side of a differential amplifier and the output side of the pulse width modulator as in the prior art. The power switching element therefore is shut off immediately and hence protected as soon as an overcurrent flowing through the switching element exceeds a prescribed value. Moreover, since the gate circuit which has been closed as above can be opened automatically by a latch circuit when the latch is reset periodically by a signal from a trailing edge detecting means, it is not necessary to manually reset the switching power supply rendered inoperable by the occurrence of the overcurrent. Thus, normal operation of the circuitry can be restored automatically and immediately when the primary current returns to normal because of a normalization of load or the like.

It is to be noted that while the latch circuit is reset by the reset pulse from the trailing edge detecting means in the foregoing embodiments, the latch reset timing need not necessarily coincide with the trailing edge of the control pulse; it will suffice if this is achieved any time prior to the arrival of the next control pulse. It will therefore be understood that exactly the same effect can be obtained if, by way of example, a timer circuit is provided and adapted to issue a pulse a set time after the leading edge of a control pulse has been detected.

What we claim is:

1. An overcurrent protection circuit for a switching power supply circuit, the switching power supply circuit having a primary side supplied by an alternating current source, a power transformer and a secondary side producing direct current voltage, said overcurrent protection circuit being connected so as to interrupt current in the primary winding of said power transformer, said overcurrent protection circuit comprising:
 (a) a power switching element connected in series with the primary winding of the power transformer for interrupting the primary current of the power transformer;
 (b) driver means for supplying power to said power switching element, said power switching element conducting the primary current of the power transformer when said driver means is energized;
 (c) a control circuit, having a first input connected to the secondary side of the switching power supply circuit and having a second input connected to a first reference voltage, for generating control pulses each of which has a trailing edge which is modulated in width according to variations in the magnitude of the direct current voltage detected on the secondary side of the switching power supply circuit, said control circuit having an output for supplying said control pulses to activate said driver means;
 (d) overcurrent detecting means, having an input connected to the primary winding of the power transformer, for generating, as an output, an overcurrent detection signal immediately upon detection of current, in the primary winding of the power transformer, exceeding a predetermined value;
 (e) an R-S type flip-flop having a first input connected to the output of said overcurrent detection means to receive a "set" signal from said overcurrent detection means, having a second input, and having an output for supplying a continuous signal when said R-S type flip-flop is in the "reset" state;
 (f) a first AND gate, having a first input connected to the output of said R-S type flip-flop, having a second input connected to the output of said control circuit, and having an output connected to said driver means, for turning said driver means on or off by selectively passing or blocking said control pulses, said first AND gate operating to block said control pulse upon detection of an overcurrent condition during the same control pulse in which said overcurrent detection signal is generated by said overcurrent detecting means, said driver means being turned off when said R-S type flip-flop has been placed in the "set" state and said driver means being subject to switching control according to said control pulses when said R-S type flip-flop has been placed in the "reset" state; and
 (g) pulse generating means, having an input connected to the output of said control circuit and having an output connected to the second input of said R-S type flip-flop, for generating said "reset" signal in response to the trailing edge of said control pulse so that said reset signal and said overcurrent detection signal cannot be supplied to said flip-flop simultaneously after an overcurrent condition is detected, said pulse generating means including means for placing said R-S type flip-flop in the "reset" state during the next said control pulse generated after said overcurrent detection signal is generated with a time delay of at least the width of said control pulse and only when said control pulse is not being received by said AND gate.

2. The apparatus of claim 1, further comprising:
 (a) a J-K type flip-flop having an input connected to said pulse generating means, and having an output which supplies one pulse for every two pulses received by said input; and (b) a second AND gate having a first input connected to the output of said control circuit, having a second input connected to the output of said J-K type flip-flop, and having an output connected to said second input of said first end gate, for providing every other said control pulse to said first AND gate.

3. The apparatus of claim 1 or 2, wherein said power switching element is turned off for a greater period of time than it is turned on.

4. The apparatus of claim 1, wherein said control circuit comprises:

(a) a differential amplifier, having a first input connected to the secondary side of the switching power supply circuit, having a second input connected to the first reference voltage, for comparing the output voltage of the switching power supply circuit to the first reference voltage, and having an output for supplying a pulse varying in amplitude according to the difference in amplitudes of the output voltage of the switching power supply circuit and the first reference voltage; and (b) a pulse width modulator having an input connected to said output of said differential amplifier, and having an output, connected to said first AND gate and said pulse generating means, for supplying said control pulse.

5. The apparatus of claim 4, wherein said apparatus is operatively connected to an outside power source and said pulse width modulator comprises:

(a) signal generating means, having an input connected to the outside power source, for supplying, as an output, a signal of a predetermined waveform; and (b) modulating means, having a first input connected to the output of said signal generating means, having a second input connected to the output of said differential amplifier, for adjusting the width of the output of said signal generating means according to the amplitude of the output of said differential amplifier, and having an output, connected to said first AND gate and said pulse generating means, for supplying said control pulse.

6. The apparatus of claim 5, wherein said signal generating means comprises a sawtooth generator.

7. The apparatus of claim 5, wherein said signal generating means comprises a quartz oscillating circuit.

8. The apparatus of claim 1 or 2, wherein said control circuit comprises integrated circuitry.

9. The apparatus of claim 1 or 2, wherein said overcurrent detection means comprises:

(a) a current transformer having an input connected to the primary of the power transformer and having an output for producing a signal according to the amount of current detected in the primary winding of the power transformer; and (b) a comparator circuit, having a first input connected to the output of said current transformer and a second input connected to a second reference voltage, for comparing the signal of said current transformer with the second reference voltage, and having an output, connected to the first input of said R-S type flip-flop, for generating said overcurrent detection signal when a predetermined level of primary current is detected by said current transformer.

10. The device of claim 1 or 2, wherein said pulse generating means comprises integrated circuitry.

11. The apparatus of claim 1 or 2, further comprising time delay means for delaying said first pulse generated by said pulse generating means for a predetermined amount of time, and for providing a delayed first pulse to said R-S type flip-flop.

* * * * *

UNITED STATES PATENT AND TRADEMARK OFFICE
CERTIFICATE OF CORRECTION

PATENT NO. : 4,330,816

DATED : 18 May 1982

INVENTOR(S) : Imazeki et al

It is certified that error appears in the above-identified patent and that said Letters Patent is hereby corrected as shown below:

Col. 4, line 10, "ampitude" should be --amplitude--.

Col. 6, line 6, "$T_5$" should be --$t_5$--.

Signed and Sealed this

Twelfth Day of October 1982

[SEAL]

Attest:

GERALD J. MOSSINGHOFF

Attesting Officer     Commissioner of Patents and Trademarks